United States Patent [19]
Boeve

[11] Patent Number: 5,583,663
[45] Date of Patent: Dec. 10, 1996

[54] COMPACT TRANSPARENT SHEET DIGITIZER OFFERING ANGULAR AND POSITIONAL ACCURACY OF A SHEET AND UNIFORM SHEET MOTION

[75] Inventor: Gerard Boeve, Edegem, Belgium

[73] Assignee: Agfa-Gevaert, Mortsel, Belgium

[21] Appl. No.: 267,466

[22] Filed: Jun. 28, 1994

[30] Foreign Application Priority Data

Jul. 8, 1993 [EP] European Pat. Off. ............ 93202002

[51] Int. Cl.$^6$ ............................ H04N 1/04; G03B 27/48; B65H 29/00; B65H 9/16
[52] U.S. Cl. ......................... 358/487; 358/496; 358/498; 355/321; 355/50; 355/97; 271/184; 271/188; 271/248; 271/225
[58] Field of Search ..................... 355/308, 321, 355/72, 75, 77, 104, 210, 211, 50, 234, 233, 97, 106; 358/487, 296, 302, 488, 489, 496, 498, 474, 909.1, 506; 271/150, 184, 185, 188, 225, 248, 3, 18, 109, 225, 275, 9.01; D18/49

[56] References Cited

U.S. PATENT DOCUMENTS

| | | | |
|---|---|---|---|
| 4,597,571 | 7/1986 | Redding et al. | 271/150 |
| 4,799,072 | 1/1989 | Akimoto et al. | 354/76 |
| 4,864,411 | 9/1989 | Hale et al. | 358/494 |
| 5,083,170 | 1/1992 | Sawada et al. | 355/319 |
| 5,218,463 | 6/1993 | Lianza et al. | 358/487 |

FOREIGN PATENT DOCUMENTS 4021660  7/1990  Germany.

*Primary Examiner*—Kim Vu
*Assistant Examiner*—Kimberly A. Williams
*Attorney, Agent, or Firm*—Brumbaugh, Graves, Donohue & Raymond

[57] ABSTRACT

A compact digitizer apparatus for accurately scanning an image on a transparent sheet is particularly useful for scanning and storing medical x-ray photographs and other photographic-based records. The apparatus includes a photosensitive device which scans the image, and an illumination device for passing light through the sheet to project the image onto the photosensitive device. A transport system transports the sheet between the illuminating device and the photosensitive device. A guide keeps at least a portion of the sheet which is being illuminated in a fixed orientation. For guidance of the sheet, a planar sheet support keeps contact with the bottom edge of the sheet. A carrier abuts against a rear edge of the sheet to move the sheet past the photosensitive scanner device.

6 Claims, 7 Drawing Sheets

COMPACT TRANSPARENT SHEET DIGITIZER OFFERING ANGULAR AND POSITIONAL ACCURACY OF A SHEET AND UNIFORM SHEET MOTION

DESCRIPTION

1. Field of the Invention

The present invention relates to an apparatus for reading out an image on a transparent sheet and is intended in particular for use in medical or graphical applications.

2. Background of the Invention

In clinical or private radiology departments, patients are examined by means of non-invasive techniques, such as X-ray imaging, computed tomography, magnetic resonance, ultrasound etc. All these techniques deliver images: directly on transparent photographic film for use in medical imaging; or computer images, that can be recorded on this type of film too.

These films are very useful for the radiologist to examine the pathology in detail. The same film can also be transported to other departments and other physicians. The film can be stored for years and retrieved whenever necessary for comparison with the current situation.

Problems arise when the same images must be available at two different locations at the same time for examination, or when the locations are so distant that the transport time becomes critical. The storage organization and storage area also pose a problem in some hospitals, where by preference the patient carries the films home to keep them. Typically, these films are even more difficult to retrieve, because the patient may have lost them. These problems can be solved by scanning and digitizing the films, used for visual examination,.directly as they are produced (developed and dry) or before they leave the radiology department, to produce computer images from the films. These computer images can then be stored by electronic means in digital format. Today, image processing can be performed on images in digital format. E.g., for semi-automatic comparison of older medical images on film with currently acquired data, the images on the older films must be made available in digital format as computer images.

Reproduction of images from a transparent sheet on other media, is described in the European patent application EP 0 452 570 A1 "Processing and digitizing apparatus for medical radiographic film." by H. A. Primo et al.

The conversion of images—on transparent hardcopy media such as medical imaging photographic film—to computer images in digital format, requires the process of digitizing the film.

Digitizing is the process of converting optical densities of an image on a transparent sheet to binary (digital) electrical signals that represent the varying intensities of the transmitted light and thus said densities.

The optical densities are measured by transmission of a light beam from a calibrated light source through the transparent sheet and by measuring the amount of light transmitted. The measurement occurs by:

one light sensitive element (e.g. a photomultiplier or a similar light detector) or more such elements simultaneously, said elements e.g. organized in a line or regular rectangular matrix, e.g. CCD-arrays (Charge Coupled Devices).

Each element senses the light transmitted through a small area of the sheet. The form of the area can be square, rectangular, circular, elliptic or of any other shape. The whole sheet is virtually divided into small areas, and with every area corresponds an analog signal that represents the amount of light transmitted through the area. These analog signals are digitized individually—i.e. each signal is converted by an analog to digital converter (D/A-converter)—to a limited set of M binary digital signals, representing 0 or 1. These digital signals are called bits. M is mostly in the range of 1 to 16. Each said set of M digital signals represents a digital number in the range of $[0, 2^M-1]$. The number represents the amount of light transmitted through the abovementioned small area on the transparent sheet and thus the local optical density of the area. The number represented by M bits is called pixel or contone pixel, because each pixel has a large range ($2^M$) of possible values.

Every individually digitized analog signal results in one individual pixel. These individual pixels are generated sequentially by one or more of the D/A-converters. The sequence is dictated among others by the way how the light sensitive elements are arranged, how the original transparent sheet is illuminated and how the electronics address the elements.

The sequence of individual pixels is exactly known and can thus be re-arranged in a regular rectangular matrix and as such displayed on a video CRT monitor or recorded by a hardcopy device on a sheet of paper or film. In those forms, the image can be visually inspected by the user.

Scanners tend to have problems with the metrical accuracy of the scanned data. This is due to the difficulty to position exactly the transparent sheet to be scanned relative to the scanning system, or—when movement is involved—to keep the slowscan speed constant within narrow tolerances, such that scanning at a fixed rate results in scanning equidistant lines. In most scanning systems known in the art, the relative position can vary due to skew and to uncertainty about the lateral and longitudinal position. Skew is rotation of the sheet around an axis perpendicular to the sheet. The other two factors are due to translations in two orthogonal directions parallel to the plane of the sheet. Another positioning error, namely transversal displacement in a direction perpendicular to the page, can result in defocusing of the material to be scanned, resulting in a degraded spatial resolution. In order to achieve a homogeneous and known distribution of the pixels over the sheet, accurate and stable linear and angular positioning is necessary and every motion, necessary for the digitizing process, must be exactly known in time and be stable in time.

OBJECTS OF THE INVENTION

It is an object of the invention to provide an apparatus for reading out an image on a transparent sheet, which allows a precise and accurate scanning of an image on the sheet, by keeping the bottom edge of said sheet in contact with a substantially horizontal support, the-illuminated portion vertically at a fixed distance from the scanning means, and advancing said sheet forward over the support at a uniform scanspeed.

Another object of the present invention is to make the size of a digitizer small, and the output as convenient as the-output of a common automatic radiographic film processor. These processors can be coupled to the input of the film digitizer of the current invention.

SUMMARY OF THE INVENTION

In accordance with the present invention, an apparatus for reading out an image on a transparent sheet, comprising illumination means, at least one photosensitive element, and transport means for transporting the sheet between the illumination means and the photosensitive element, the transport means comprising:

means for keeping at least the portion of the sheet which is being illuminated in an upright position;

a planar substantially horizontal sheet support for keeping contact with the bottom edge of the sheet, thereby to guide the bottom edge of the sheet in a substantially horizontal plane; and a carrier arranged for movement in a plane parallel to the sheet support and for abutting against the upstanding rear edge of the sheet, thereby to move the sheet forward over the support by such abutting contact.

The sheet can be a photographic film e.g. for use in medical imaging, but it can also be any other image bearing transparent sheet e.g. an overlay for use in overhead projection, in which the densities are formed in a non-photographic way.

The terms "horizontal" and "vertical" for the purpose of the present disclosure must be understood as substantially horizontal and substantially vertical respectively, such that the ideas of the invention still apply, where verticality is necessary for taking advantage of gravity and the horizontal motion is perpendicular to the vertical direction. The purpose of the arrangement is to use the vertically downward directed gravity force and the equal upward reaction caused by the substantially horizontal planar guide means. The upward force is uniformly distributed over the bottom edge of the sheet, while the gravity force has its origin of force near center—i.e. in the gravity center—of the sheet. This arrangement causes a stable equilibrium that results in a constant and—within near tolerances—well known orientation of the sheet around an axis perpendicular to the plane of the sheet. The arrangement also guarantees that the vertical position of the sheet relative to the scanning means is known very accurately, since the horizontal guiding means serves as the linear positional reference in the vertical direction.

The carrier can be any means abutting to the rear edge of the sheet, pushing the sheet at a known speed over the horizontal guiding means. The carrier itself can be mounted on an endless belt or anything else known in the art to transmit rotational motion e.g., of a stepper motor to a carrier moving linearly during useful operation. The horizontal sheet support can be a planar plate, a rollerbed or anything else known in the art to keep the sheet orientation and vertical displacement fixed.

DETAILED DESCRIPTION OF THE INVENTION

Figure 1:
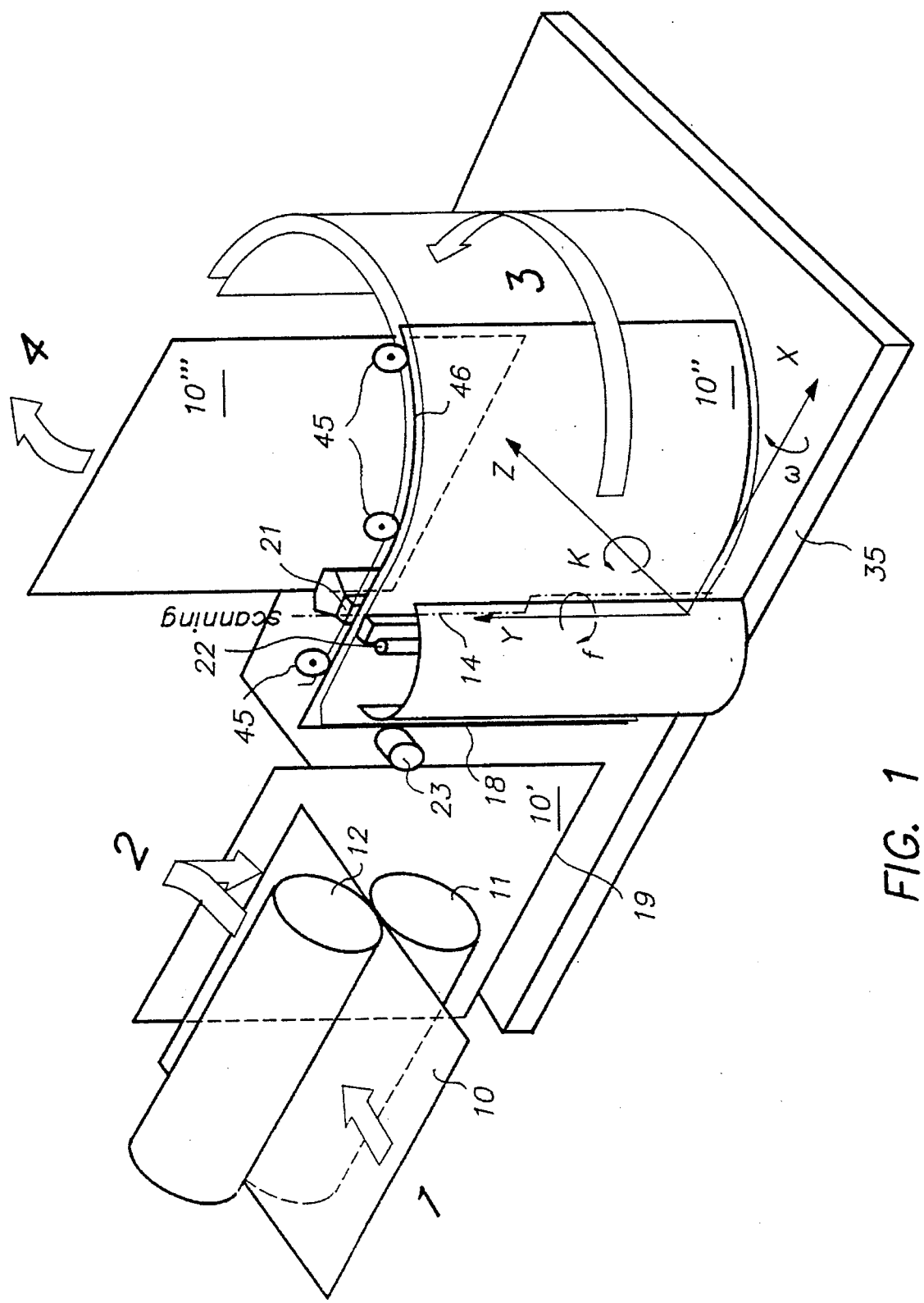
Figure 2:
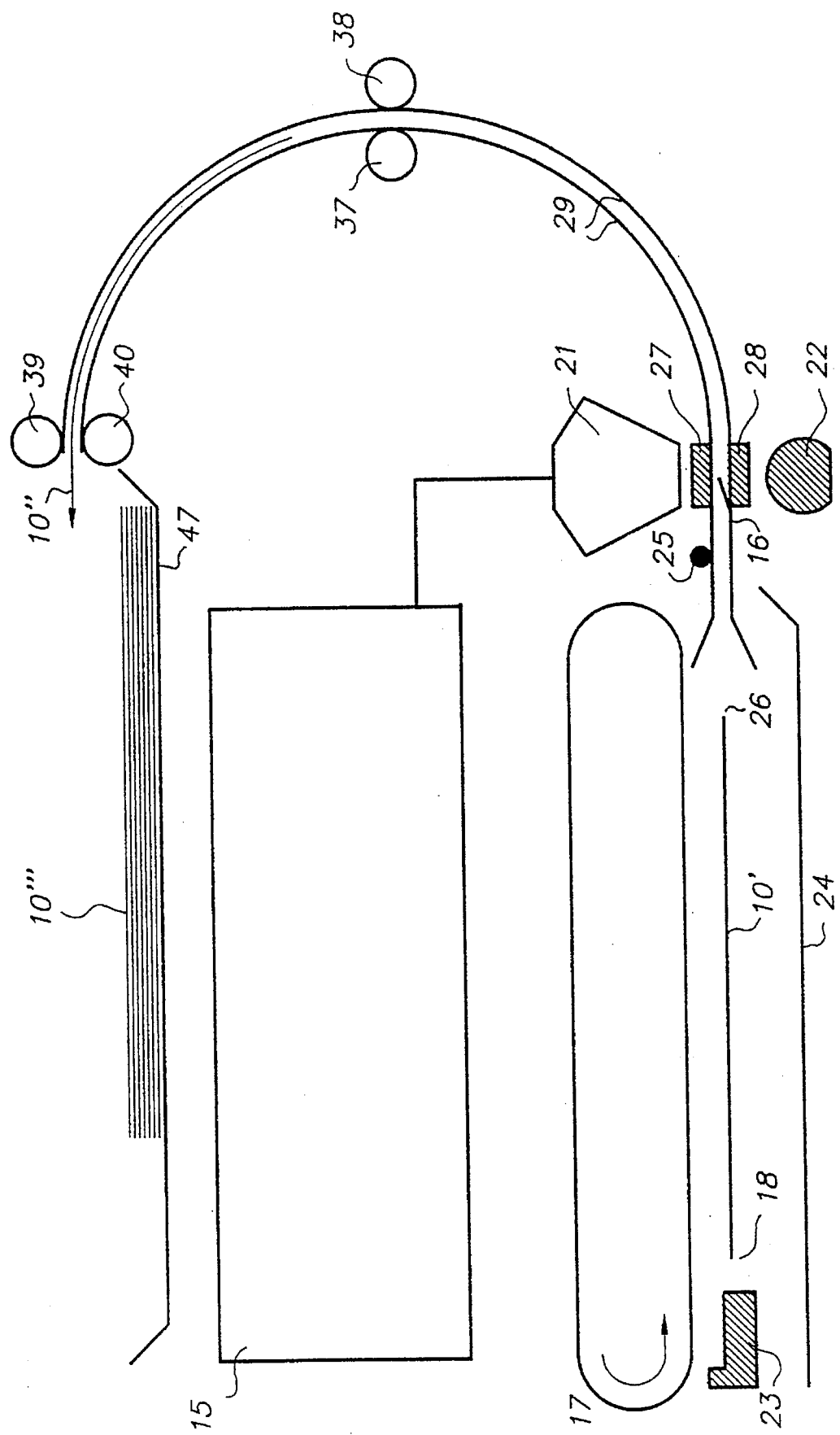
Figure 3:
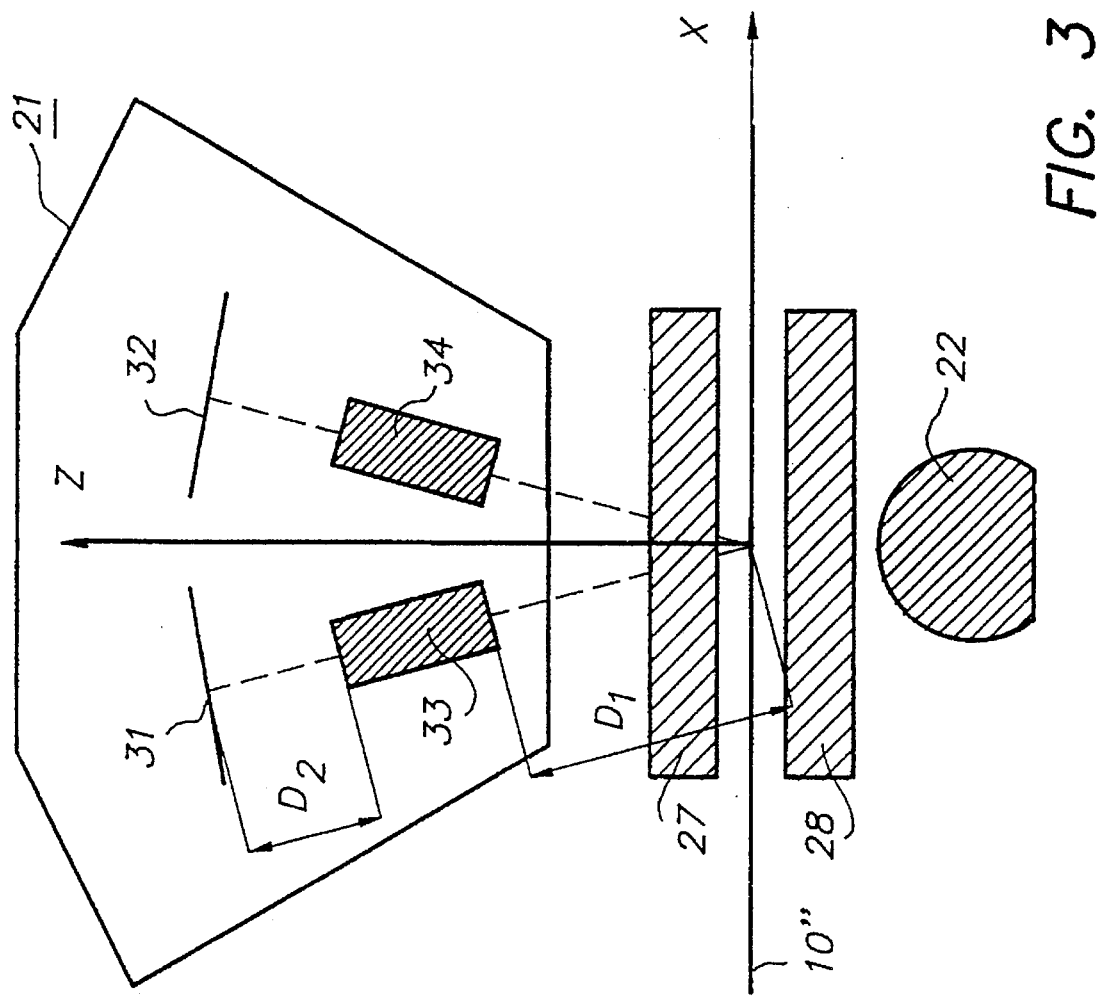
Figure 4:
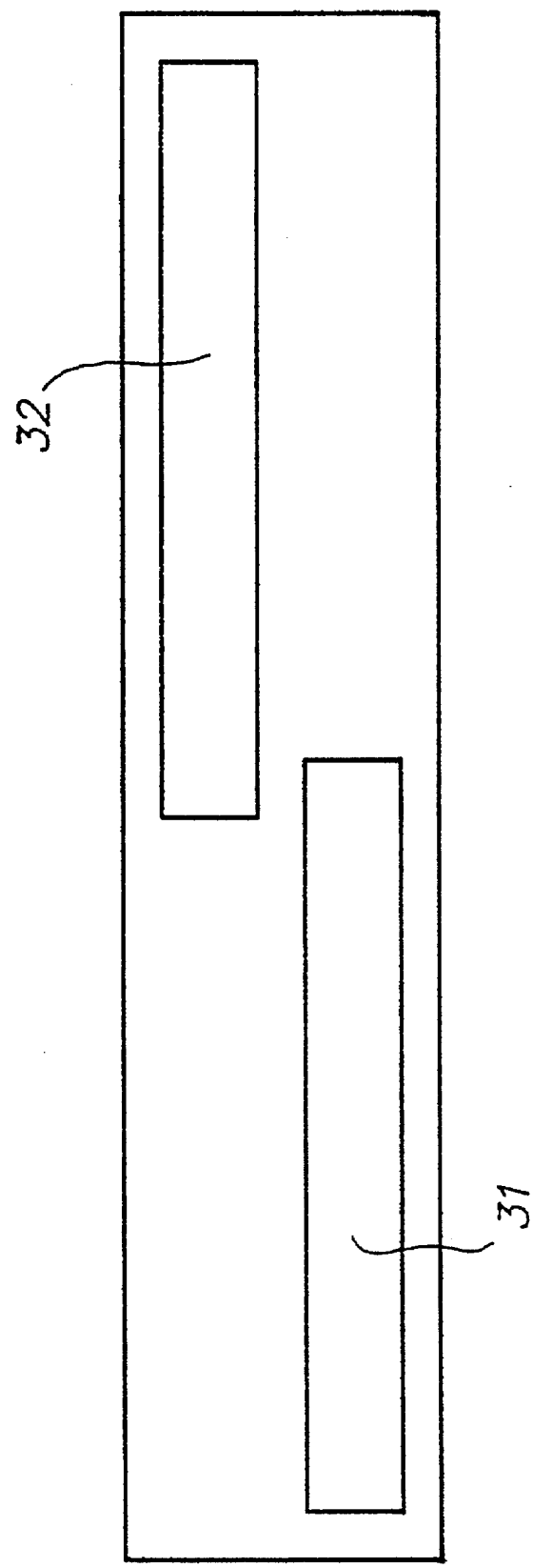
Figure 5:
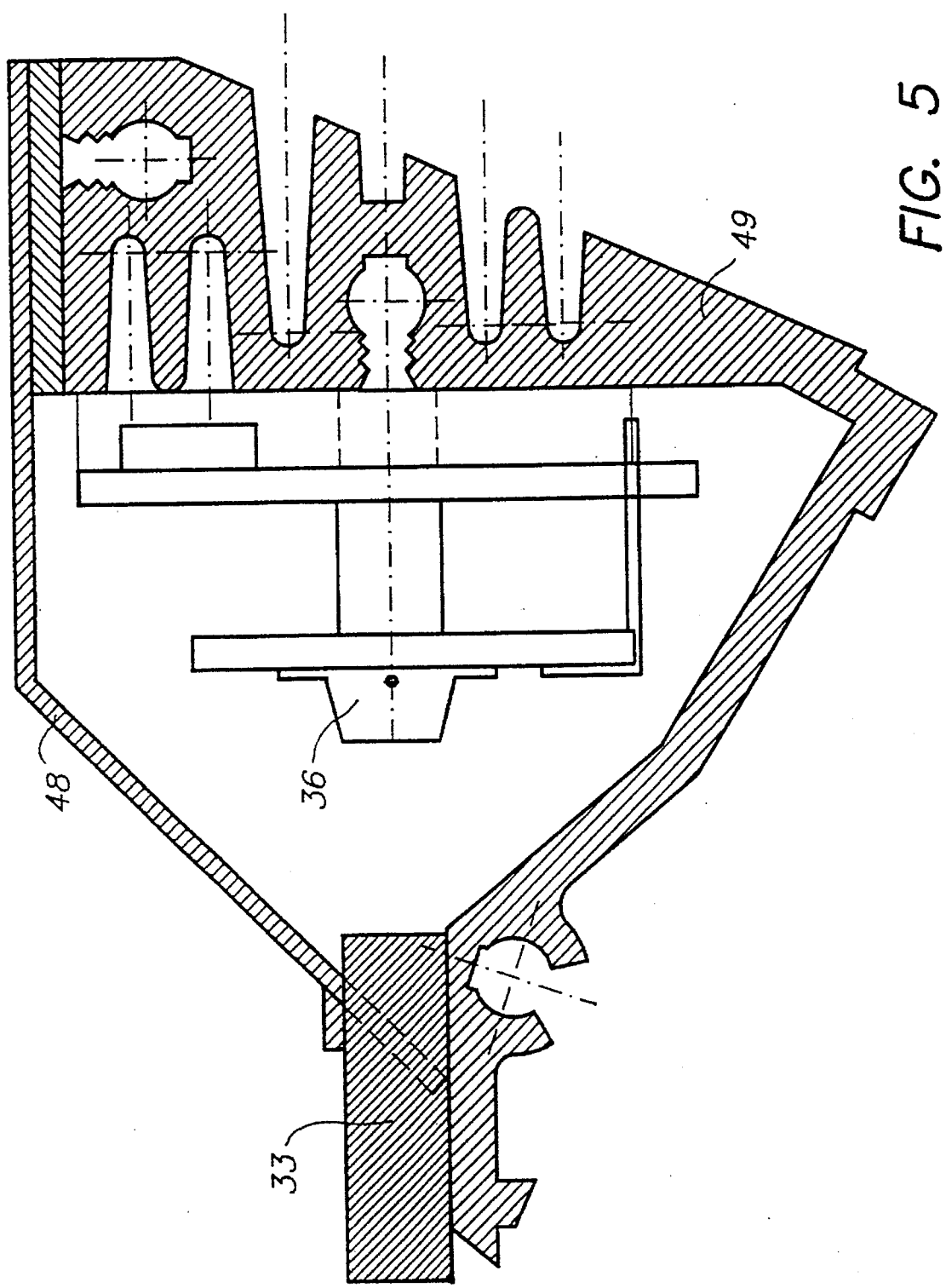
Figure 7:
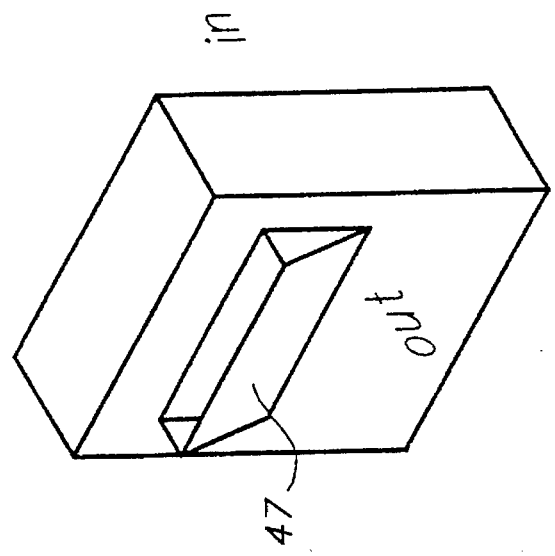
Figure 6:
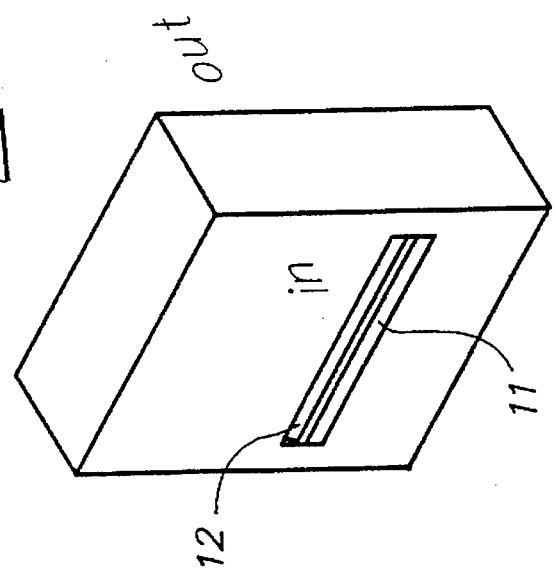
Figure 8:
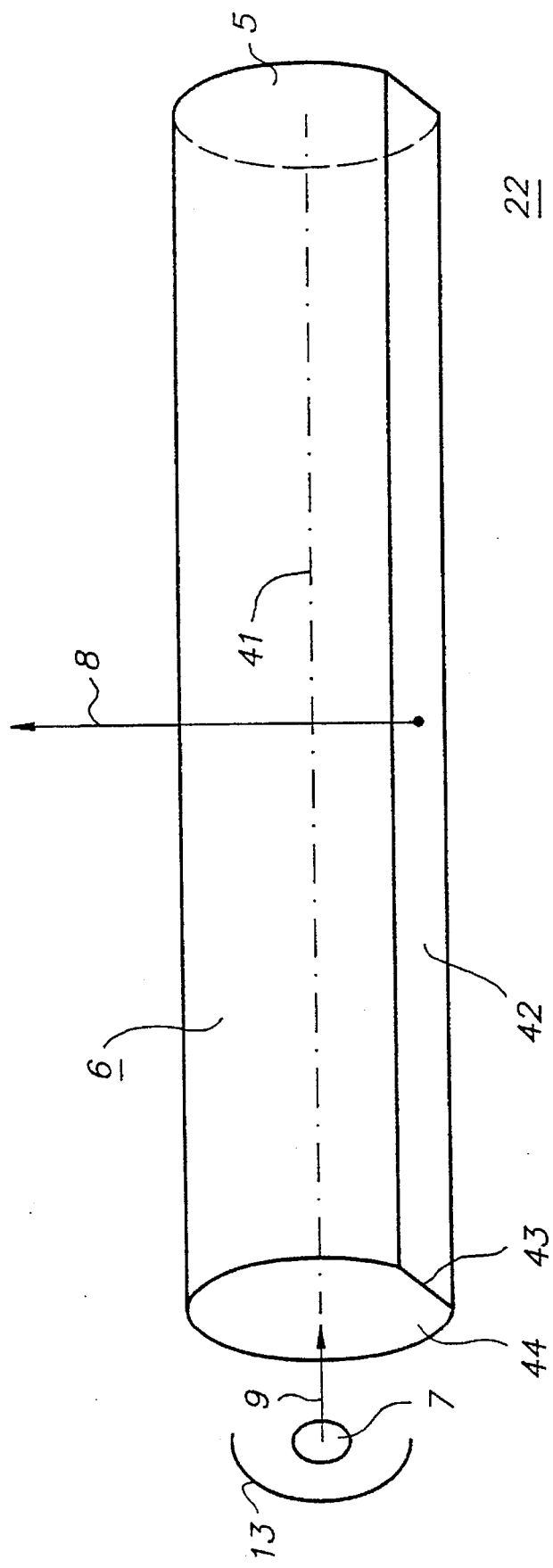

The invention is described hereinafter by way of example with reference to the accompanying figures wherein:

FIG. 1 is a perspective view of one embodiment of an apparatus according to the present invention, FIG. 2 is a top view of the apparatus, FIG. 3 is a top view of the scanning means and illumination means, FIG. 4 is a side view of the contact CCD array placement, FIG. 5 is a top view of a CCD element and Selfoc in an appropriate housing, FIG. 6 is a front view of the digitizer housing, FIG. 7 is a back view of the digitizer housing, FIG. 8 is a side view of the illumination means.

Referring to FIG. 1, a transparent sheet or photographic film 10 bearing a photographic image is shown during four important phases of the scanning process: during insertion of the film 10 in the digitizer (input rollers 11 and 12 of FIG. 6)—as illustrated by the arrow 1, during vertical positioning of the film 10' as shown by arrow 2, during scanning of the film 10' as shown by arrow 3 and at disposal of the film 10''' (arrow 4), e.g. in the output tray 47 (FIG. 7).

The film 10 can be loaded in three manners: manually sheet by sheet, by a rapid-feeder, known in the art such as the film feeding mechanism used in the CURIX CAPACITY PLUS film processor, and automatically as output of a chemical film processor. Film 10 may have been obtained by the processing of an X-ray film, which was exposed to an X-ray image. Suitable processors for carrying out processing are CURIX 460, CURIX HT-530U, CURIX HT-530C, CURIX CAPACITY PLUS, CURIX 260, CURIX 160 and CURIX 60. "CURIX" is a registered trade mark of Agfa-Gevaert N.V. Mortsel Belgium. FIG. 6 shows where the film enters the film digitizer between rollers 11 and 12. For manual feeding, it is not necessary to take care of the orthogonal orientation or flipping of the film. Mirroring and orthogonal rotation of the scanned images can be done later simply by dedicated hardware means or digital image processing software controlled means respectively.

The film is gripped by rollers 11 and 12. One or both are driven by a drive means, not shown in the drawing. Roller 11 is mounted to the apparatus on a rotative axis, not shown, and roller 12 is mounted on an axis parallel to the axis of roller 11, and can move along the plane connecting the axis of roller 12 and roller 11. Pressure means, not shown on the figures, moves the axis of roller 12 towards the axis of roller 11, and causes a pressure force between roller 11 and 12. Once a sheet of film enters between the two rollers 11 and 12, the pressure force is applied from roller 12 to film 10 and from roller 11 to film 10. The friction between roller and film is proportional to the pressure force and moves the film 10 towards the scanning means.

Vertical deflecting means, close to the exit of rollers 11 and 12, forces progressively the film to move upward. Once the sheet 10 passed the rollers 11 and 12, the friction force disappears and only gravity acts on the film, thereby causing the film to fall vertically until it reaches position 10' in scanbuffer 24 (FIG. 2). The fall of the film is stopped by a horizontal support means 35. After the film first touches the horizontal support means 35, the gravity and the reaction force of the support means 35 force the bottom edge of the film to be parallel to the support means. Even a film that has been fed with a considerable skew, will have its bottom edge 19 perfectly aligned with the horizontal support means 35. This goal is met thanks to the fact that the input system is totally decoupled from the scanning system after the fall. From this moment on, the film can be seen as a solid body. The film is now in a position in which a carrier 23 can make contact with the rear edge 18 of the film. The arrangement shown in FIG. 2 forces the film to pass between two glass plates 27 and 28, close to each other, to keep the film in an upright position, parallel to the (X,Y) plane. In FIG. 1, we define a system with three perpendicular axes X, Y and Z, and rotations around these axes in the directions of arrows w, f, k. Because of the stiffness of the film and the absence of transversal forces with a component parallel to the Z-axis, all forces (i.e. gravity and reaction from support means 35; horizontal pushing force from carrier 23 and reaction) act in the vertical (X,Y) plane and won't bend or skew the film, thus behaving as a solid body. A solid body has 6 parameters of positional freedom in three-dimensional space. Once these parameters are fixed or known, the location of every other point of the solid body in space is known. These parameters are the position (X, Y, Z) and the attitude or three-dimensional orientation (w, f, k). As shown in FIG. 1, three perpendicular axes correspond to the film such that the film is in the (X,Y) plane. The bottom edge of the film forms the X-axis, the Y-axis is perpendicular to the X-axis and in the plane of the film. The Z axis is perpendicular to the (X,Y) plane, k is the angle of rotation around the Z-axis, f around the Y-axis, w around the X-axis.

In the embodiment of this invention, the horizontal guiding means guarantees that the lateral or Y-position of the film is always fixed, also during transport of the film from position 10' to 10"

The horizontal guiding means also guarantees that the orientation k remains fixed during the scanning process, resulting in a correct angular position of the film at any moment.

Furthermore, the force of gravity can be supplemented by pressure means 45, that is operative on the top edge 46 of the sheet 10". As illustrated in FIG. 1, this can be achieved by nondriven rollers, pressed on the top edge by springs, not shown. Pressure means can also be realized by a longitudinal spring, making contact with the top edge 46 of the film.

As is illustrated in FIG. 2, once the film comes to a standstill in position 10' on the horizontal support, it undergoes three motion phases:

rapid movement of the front edge 26 towards the illumination means 22 and scanning means 21;

slow movement passing between illumination means 22 and scanning means 21 while the film 10" is scanned; and rapid movement to the output tray 47.

The first motion from scanbuffer 24 to scanning means 21 is performed at high speed, so as to improve the total throughput of the digitizer—even for films with a small format—independent from the position where they were deposited by the rollers 11 and 12 in scanbuffer 24. Carrier 23 makes contact with the rear edge 18 of the film 10' and pushes it along the X-axis towards the scanning means 21. The carrier 23 is mounted on an endless belt 17. Carrier 23 on belt 17 is at a height of about 7 inches (ca. 180 mm) above guiding means 35, so as to fit for film sizes between 8" and 14" The belt can occasionally carry two carriers equally distributed over the length of the belt 17, to increase system throughput. The belt is driven by a stepper motor means, not shown in the drawing. The speed of the motor can be increased or decreased by electronic means. The constant velocity is better guaranteed by use of the described mechanism instead of by using roller pairs, because roller pairs introduce unwanted shocks and thus microbanding effects in the digital image, at least at the start and the end of the scan. At the start and the end of scanning, the X-position of the film is not a linear function of time, such that the X-position is not known accurately.

A detection means 25 senses when the film reaches the reference position, i.e. the position where the front edge of the film reaches the glass plates 27 and 28. The detection means commands the stepper motor to slow down the speed until the film runs at a constant slowscan speed. By the time the front edge 26 of the film 10' reaches the scanning means 21, the film moves at the constant slowscan speed. While the horizontal guiding means keeps Y and k fixed, the carrier 23 guarantees that the position along the X-axis increases uniformly in time. Therefore, the X-position of the film is known very accurately at every moment when a line 14 (FIG. 1) of densities of the image on the film must be scanned.

During the transport of the film 10", scanning and digitizing parallel equidistant lines is performed. Therefor, illumination means 22 (FIG. 2) continuously illuminates the passing sheet. At every point on a vertical line 14 of the film, a light beam incident on the film is partly transmitted through the film and reaches the scanning means 21. The scanning means 21 is further detailed in top view along the Y-axis in FIG. 3. The scanning means 21 is a sealed module and comprises two contact CCD modules 31 and 32. A side view of these CCD modules along the Z-axis is shown in FIG. 4. Two CCD modules known in the art, preferably type TCD128AC, are butted against each-other, to span the maximum filmwidth, being 14" or 355.6 mm. These are contact CCD's for scanning A4 sized originals (210 mm×297 mm). Each CCD module consists of an array of about 3400 CCD elements, each element measuring 1"/400= 0.0635 mm. This gives a scan resolution of 400 dots per inch in continuous tone. The digitizer must be able to scan images on film having a density range between 0 and 3.2D, with an overall accuracy of at least 0.01D. This quality can be reached with the preferred CCD type.

The scanning means 21 (FIG. 3) further includes Selfoc (Trade Name for self-focusing lens arrays) arrays 33 and 34, to guide and converge the light beams coming from the scanned point on the film 10" to the CCD modules 31 and 32 respectively. This light guiding means has been preferred over other means known in the art, as to keep the optical path short in a compact design. The sealed module 21 further enables a robust design against shock, vibration and dust. The system can therefore be operated in the field with less care.

With CCD array 31, corresponds Selfoc array 33, forming one optical system. The same applies for CCD array 32 and Selfoc array 34. Both optical systems are placed in a V-shape formation, in order to have an overlap of at least one CCD element, at the place where the two CCD arrays are abutted, such that at least one place on the scanline 14 is digitized by two CCD elements. It is necessary to scan one full scanline 14 over the whole width of the sheet at the same moment, and thus from the same optical line 14, because minor deviations in the speed of the sheet or internal electronic timing base make the position of the scanline on the sheet unpredictable within the narrow tolerances as the time difference between two scan operations grows.

The coplanarity and overlap of the two CCD arrays 31 and 32 is done in a controlled environment, before the CCD-module is sealed.

The light beam illuminating scanned line 14, is generated by the illumination means 22. This element can have different embodiments. The goal is to produce a planar light beam, perpendicular to the transparent sheet, parallel to the Z-axis. In the preferred embodiment one may start from a point-shaped light source 7 (FIG. 8), producing a linear light beam 9. This linear light beam is transformed to a planar light beam by optical means 6.

In a first preferred embodiment, the optical means 6 consists of a nearly circular glass cylinder, with planar ends 44 and 5, in combination with a light emitting means 7. The glass cylinder 6 has a planar portion 42, parallel to the axis 41 of the cylinder and with edge 43 at end 44. The planar portion 42 is made knurled for uniform diffraction of the incident light. At one or both ends, a point shaped light source 7 like a halogen lamp, e.g. of 400 Watts is installed. The light emitted by this lamp 7 goes partly into the cylinder, is partly reflected by reflection means 13 on the side opposite to the planar end 44, and is partly lost in other directions. Part of the light 9 going into cylinder 6, leaves the cylinder at the other planar end 5. At this end, a reflection means—coated to the planar end 5—is installed for reflecting leaving light back into the cylinder.

In another embodiment (not shown), a second halogen lamp can be installed at the planar end 5, having the same embodiment as the first halogen lamp 7. Inside cylinder 6, lightbeams in different directions incident to the round portions of the cylinder get totally diffracted and further travel into the cylinder until they are incident on planar portion 42 of the cylinder. The light beam is completely dispersed by this portion and part of the light leaves the cylinder as a light beam in a direction 8 perpendicular to the axis of the cylinder; another part is again totally diffracted against the round portions of the cylinder 6.

The advantage of a point shaped light source is the ease to filter and eliminate infrared radiation, for which CCD's are sensitive as well. The CCD's cannot detect the difference between infrared radiation and visible light. Filtering of infrared radiation avoids the transparent optical density to be mixed up with heat from the transparent sheet material. Cooling fins 49 (FIG. 5) are required in the housing 48 of the sealed module to carry off the heat, since infrared radiation is only partly filtered and because of electrical energy consumption within the individual CCD cells 36.

Another embodiment for optical means 6, known in the art, comprises a bundle with optical fibres, having first ends bundled together near a light source, and opposite ends arranged in a linear array. The lightsource can be likewise a halogen lamp or any other type of illumination means that generates electromagnetic waves within the wavelength of visible light (i.e. 300–700 nm). Still further, the illumination means 22 can be formed by a tube-shaped lamp, e.g. a TL lamp, producing a uniform light over its length. The light is occasionally reflected by a reflection means placed on the side opposite to the film.

The light-leaving the cylinder in the preferred embodiment, and going in the direction of the Selfoc lens array 33 and 34, passes the transparent sheet 10" orthogonally (see FIG. 3). By passing the sheet, a very small amount of the light is reflected, and depending on the local optical density of the image on the sheet 10", a certain amount of incident light is absorbed and another part is transmitted. The transmitted part of light is incident to at least one Selfoc array 33 and/or 34. Selfoc arrays 33 and 34 are optical guide means to transport diverging light from one light source at a fixed distance D1 from the Selfoc to the opposite side of the lens, converging back again in one point located at 31 (or 32), at a distance D2, which may have a different length from D1, as long as D1+D2 is kept constant for all points. At the distance D2 from the opposite side, the CCD array is placed, capturing all transmitted light that was incident to the Selfoc array. Each individual CCD element 36 (see FIG. 5) receives the light corresponding to a small portion of the film. The amount of light, incident on the CCD element, gives an analog electrical signal that can be further processed by electronic means 15 (FIG. 2), connected to both CCD modules 31 and 32.

Said electronic means processes the analog electrical signals by techniques known in the art of image processing. Some of these techniques are implemented in the HORIZON scanner, marketed by Agfa-Gevaert N.V., Mortsel, Belgium, and can be applied to the above-mentioned analog electrical signals. These signals are converted to a set of digital values, representing a digital image or computer image. Computer images can be electronically stored for a short (seconds) or long (years) period, and if necessary displayed on a video monitor or registered on hardcopy such as another transparent sheet or paper. The accuracy of the distance D1 between the film and the Selfoc array to be equal to the fixed distance D2, can be improved by pressure means 16 (see FIG. 2), e.g. springs or a longitudinal flexible sheet.

As the transparent sheet gets scanned, the detection means 25 detects the rear edge of the film 18. Because the distance between the detection means 25 and the center line of the scanning means 21 is fixed, moreover the slowscan speed is also fixed and known and the time T1 needed for the rear edge 18 of the film 10' to reach the center line of the scanning means 21 is known. After the detection means 25 detects the rear edge 18 of the film 10', the stepper motor causes the sheet 10' to continue the horizontal slowscan motion during a period of time T1. After that time, the image on the film 10' is completely scanned and the third motion can start.

In order to keep the size of the digitizer small and the system convenient for combination with film processing apparatus such as the AGFA CURIX system marketed by Agfa-Gevaert N.V., Mortsel, Belgium, the scanned portion of the film is guided through a U-shaped guiding means 29, e.g. formed by two circular cylindrical plates with the same center. The guiding means causes the film to be rotated 180 degrees as it performs the third motion, to reach output tray 47. To start the third motion, two roller pairs—shown in FIG. 2—become active. The first roller pair consists of left roller 37 and right roller 38. The second roller pair consists of left roller 39 and right roller 40. The four rollers are mounted on the U-shaped guiding means 29. The four rollers are activated by a roller drive means not shown, causing a rotation with a linear velocity considerably higher than the slowscan speed, in order to improve the overall throughput of the system up to five films per minute, films with maximum size of 14"×17". The two rollers of each pair move towards each other, until the film 10" is pressed between them. Once the pressure is built up, the roller pairs cause the film 10" to be transported quickly to film output tray 47, where it can be manually retrieved by the operator.

In another embodiment, the direction of the lightbeams is reversed: the scanning means 21 is replaced by a scanning laser lightsource—scanning caused by a rotating polygonal mirror or a galvanometer deflecting a light beam from a steady laser source. The laser light scans vertical line 14 on film 10". The transmitted light is incident on cylinder 6, where planar portion 42 disperses the incident light in all directions, also towards planar ends 5 and 44. Point shaped light source 7 is substituted by a light sensitive element, like a photomultiplier means, that converts an amount of light to an analog electrical signal, proportional to the amount of light captured by the photomultiplier. The electrical signals generated from the photomultiplier means are converted by electronic means 15 to a digital image as described before. The bottom planar end 5 of the optical means 6 can be reflectively coated, or—in another embodiment—transmit the amount of light incident to the bottom planar end 5 to another photomultiplier means.

Although the present invention has been described with reference to preferred embodiments, those skilled in the art will recognize that changes may be made in form and detail without departing from the spirit and scope of the invention.

We claim:

1. An apparatus for scanning an image formed on a transparent sheet, comprising:

photosensitive means for scanning the image on the sheet;

means for passing light through the sheet to the photosensitive means; and means for transporting the sheet between the light passing means and the photosensitive means, the transporting means comprising:

means for keeping at least a portion of the sheet in an upright orientation;

contact means for keeping contact with a bottom edge of the sheet to guide the bottom edge of the sheet in a substantially horizontal plane; and carrier means for abutting against a rear edge of the sheet and for thereby to move the sheet forward over the contact means.

2. Apparatus according to claim 1, comprising guide means (29) for deflecting the path described by the bottom edge (19) of the sheet.

3. Apparatus according to claim 2, wherein said guide means (29) for deflecting the path is arranged for deflecting the sheet path 180 degrees.

4. Apparatus according to claim 1, further comprising pressure means (45) which is operative on the top edge (46) of the sheet to supplement the force of gravity.

5. Apparatus according to claim 1, which is arranged for use in medical applications.

6. Apparatus according to claim 5, which is arranged for digitizing conventional X-ray films.

* * * * *